(12) United States Patent
Zordan et al.

(10) Patent No.: US 11,762,370 B2
(45) Date of Patent: Sep. 19, 2023

(54) PRECISION CONTROL THROUGH STITCHING FOR MATERIAL PROPERTIES OF TEXTILES

(71) Applicant: Clemson University, Clemson, SC (US)

(72) Inventors: Victor B. Zordan, Clemson, SC (US);
Ella A Moore, Clemson, SC (US);
Michael Porter, Clemson, SC (US);
Ioannis Karamouzas, Clemson, SC (US)

(73) Assignee: Clemson University Research Foundation, Clemson, SC (US)

( * ) Notice: Subject to any disclaimer, the term of this patent is extended or adjusted under 35 U.S.C. 154(b) by 0 days.

(21) Appl. No.: 16/902,056

(22) Filed: Jun. 15, 2020

(65) Prior Publication Data

US 2021/0003994 A1   Jan. 7, 2021

Related U.S. Application Data

(60) Provisional application No. 62/862,037, filed on Jun. 15, 2019.

(51) Int. Cl.
*G05B 19/4155* (2006.01)
(52) U.S. Cl.
CPC ............ *G05B 19/4155* (2013.01); *G05B 2219/34177* (2013.01)
(58) Field of Classification Search
None
See application file for complete search history.

(56) References Cited

U.S. PATENT DOCUMENTS

| | | | | |
|---|---|---|---|---|
| 5,179,520 A | * | 1/1993 | Hayakawa | D05B 19/08 700/138 |
| 6,587,745 B1 | * | 7/2003 | Polden | D05B 19/08 700/138 |

(Continued)

FOREIGN PATENT DOCUMENTS

JP       4277203 B2 *  6/2009    ............. D05B 19/08

OTHER PUBLICATIONS

Goodall, "Embroidery Basics: Understanding Density", Jun. 2009, LindeeGEmbroidery.com, pp. 2 (Year: 2009).*

*Primary Examiner* — Mohammad Ali
*Assistant Examiner* — David Earl Ogg
(74) *Attorney, Agent, or Firm* — Kim and Lahey Law Firm, LLC; Douglas W. Kim

(57) ABSTRACT

This system is directed to a computerized system for development of textiles with modified physical properties through stitching and can include a set of non-transitory computer readable instructions configured for: receiving a design pattern representing desired physical properties of a textile having a higher stiffness area and a lower stiffness area; developing a contiguous stitching pattern constrained by a pattern perimeter boundary and having a continuous stitching path, developing a first stiffness area within the contiguous stitching pattern having a first area of density, developing a second stiffness area within the contiguous stitching pattern having a second area of density wherein the first area of density has more stitch density than the second area of density, and transmitting the contiguous stitching pattern to an embroidery machine configured to provide a textile having the contiguous stitching pattern incorporating into the textile.

23 Claims, 18 Drawing Sheets

(56) References Cited

U.S. PATENT DOCUMENTS

| | | | |
|---|---|---|---|
| 7,434,423 B1* | 10/2008 | Reid, Jr. | D04B 1/102 |
| | | | 66/178 A |
| 2004/0215431 A1* | 10/2004 | Xu | D04B 37/00 |
| | | | 703/6 |
| 2010/0180809 A1* | 7/2010 | Albano | D05B 19/10 |
| | | | 112/475.19 |
| 2011/0099722 A1* | 5/2011 | Moret | A47C 27/148 |
| | | | 5/701 |
| 2011/0160894 A1* | 6/2011 | Yamada | D05C 5/04 |
| | | | 700/138 |
| 2013/0055765 A1* | 3/2013 | De Ridder | C03B 27/044 |
| | | | 428/122 |
| 2013/0269159 A1* | 10/2013 | Robitaille | D03D 3/00 |
| | | | 28/143 |
| 2015/0006230 A1* | 1/2015 | Yuki | G06Q 10/047 |
| | | | 705/7.25 |
| 2015/0267330 A1* | 9/2015 | Carrier | D05C 5/00 |
| | | | 112/475.17 |
| 2016/0316855 A1* | 11/2016 | Berns | A43B 23/0265 |
| 2017/0020646 A1* | 1/2017 | Greenhalgh | A61L 31/005 |
| 2017/0020647 A1* | 1/2017 | Greenhalgh | D05B 93/00 |

* cited by examiner

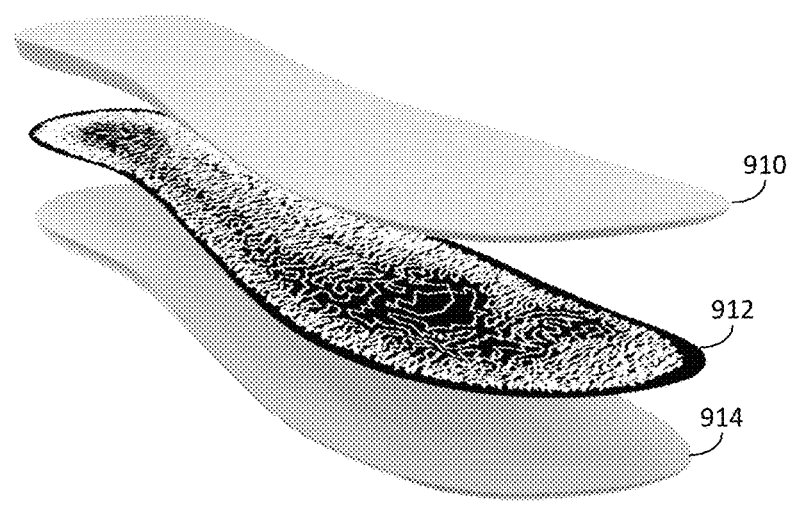
Fig. 9A
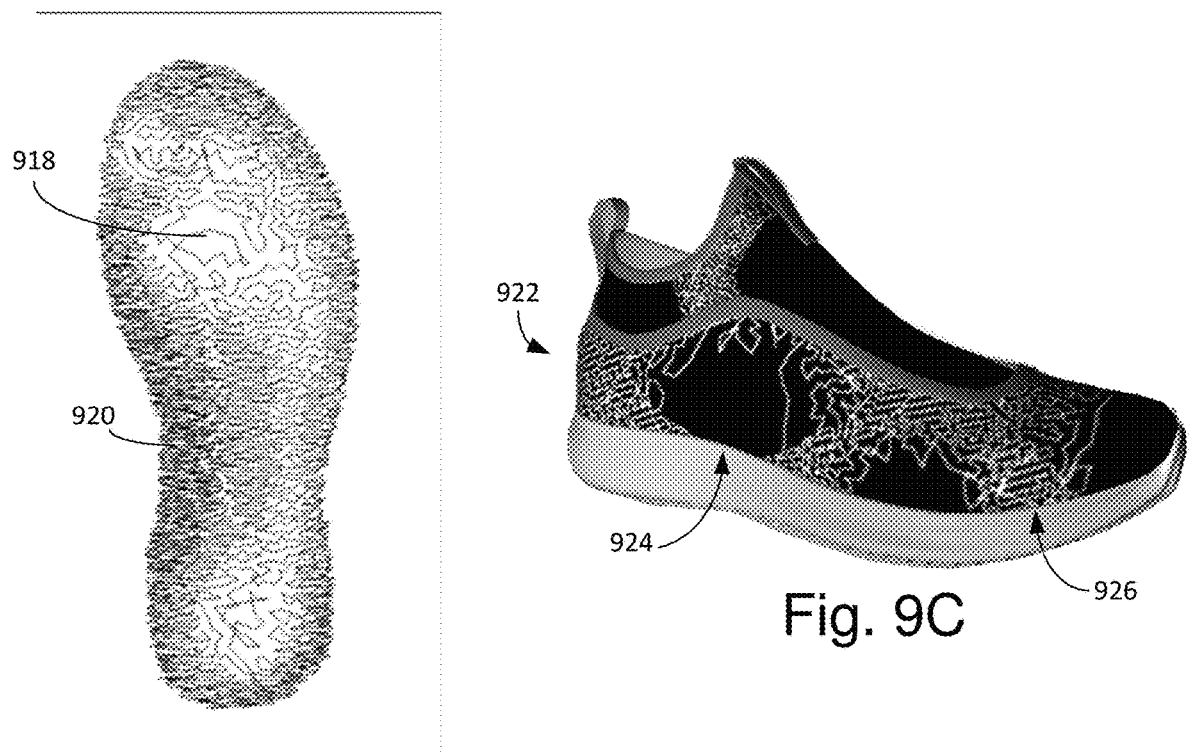
Fig. 9B
Fig. 9C

PRECISION CONTROL THROUGH STITCHING FOR MATERIAL PROPERTIES OF TEXTILES

RELATED APPLICATIONS

This application is a non-provisional claiming priority on U.S. Provisional Patent Application Ser. No. 62/862,037 filed Jun. 15, 2019.

STATEMENT REGARDING FEDERALLY SPONSORED RESEARCH

The work resulting in the technology described herein work was supported in part by the National Science Foundation under NSF Award CHS-1722997 and the EPSCoR Program under NSF Award OIA-1655740.

BACKGROUND OF THE INVENTION

1) Field of the Invention

This invention is directed to modification of the fabric's mechanical properties in a deliberate fashion by stitching to control mechanical response.

2) Description of the Related Art

Computational methods that control material properties have been the focus of research for several years. Recently, approaches have been proposed for 3D printing of various stiffness, including using microstructures and voronoi foams as well as so-called metasilicone for injecting different types of materials to control stiffness. Similarly, others have attempted to address the problem of building flexible rod meshes that automatically match input poses under boundary conditions. These are all part of a growing field in computational design that focuses on a variety of problems.

There is also a growing body of work that is looking at computational fabrication as it applies to the synthesis and incorporation of textiles and fabric objects. For example, some have addressed formalization of computational design as it applies to knitting by proposing a general knitting compiler. One attempt is an automatic approach to knitting from 3D meshes. Another attempt is a set of related problems, for example, origami with smart embroidery that uses embroidering to generate material patterns to achieve actuation. Others include techniques to include fur/textile covering a 3D shape, 3D printing using felted fabric and user-assisted 3D knitting as well as smart stretch sensors. Some of this work as led to additional work on soft robotics. One previous attempt involves combining 3D printing and stretch fabric to produce shaped 3D models from flat prints laid over pretensioned material.

In contrast to the present invention, traditional attempts have material properties that are not modified purposefully, but instead have the goal to use the stretch of the fabric to support the transformation into the three-dimensional structure.

BRIEF SUMMARY OF THE INVENTION

This invention is directed to a computer-controlled stitch design and stitching with the goal of making purposeful, precision changes to material properties of a base elastic textile. This invention can re-purpose existing embroidery machinery to serve a new purpose, namely the embroidery stitching stiffens a stretch fabric. Couple this re-purposing with the application of computer technology to devise the stitch patterns that can modify the fabric properties with fine-grain accuracy. While two techniques have been shown for adding stitches—through designed microstructural cells and stitch-level planning, the invention is not specific to the stitch placement method. For the stitch planning, a representative computer-driven path planning process is shown to serialize stitches that is similar to a greedy solution for the travelling salesman problem with a set of domain-specific constraints that dictate edge cost. It should be noted that the path planning process and solution can vary based upon the application of the modified textile. The core impact of the stitching process is to impede stretch and increase local stiffness in a purposeful manner. The efficacy of the concept through a set of design examples that are assessed under mechanical load testing is provided. Further, this invention can also control stretch direction arbitrarily across a single fabric. For example, the stretch direction of a modified textile can change mid-textile rather than having a linear stretch direction as in traditional woven fabrics. Notably, the amount of stretch stiffness in areas of the modified textile and directionality of stitching can be controlled simultaneously as well.

Modern textiles are advancing to include a wide spectrum of materials and weaves. However, the production of knit fabric artifacts that include multiple distinct properties most often requires the assembly (seaming or layering) of materials and therefore can only be done at a coarse scale. An exception is knitting with distinct patterns which leads to (limited) control over the output material of knits. This invention can provide the combination of precision embroidery/stitching with computational design to produce a spectrum of material properties without the need for seaming, e.g. within a single (un-seamed) textile artifact. The result is a strong and precision controllable material that supports a wide spectrum of design options within many application fields including but not limited to furniture and vehicle upholstery, smart clothing and medical textiles.

At its core, stitching in this fashion changes the mechanical properties of fabrics. The strength, orientation, and distribution of stitches can dictate the local properties in tension as well as (with enough stitching) in compression. Careful assembly of stitches with controlled directionality and order yield global mechanical properties that result from the aggregate effect of embroidered patterning and density. This process can increase the local strength of a fabric to create tailored distributions of mechanical properties in products.

To this end, retooling of computer-driven embroidery machines in the production of materials with arbitrarily controlled stiffnesses raises an interesting set of technical challenges. For example, by its nature, an automatic embroiderer lays down a series of stitches in a connected fashion which requires planning to serialize stitches in alignment with desired control of the tensile properties, including tensile strength and stiffness. This invention provides for additional control through at least the following contributions: 1) the use of embroidery as a means to change local material properties in a controllable and precise manner; 2) at least two distinct techniques that can accomplish a stiffness design plan through metamaterial cells and embroidery stitch planning; and 3) a stitch-specific path planning approaches that perform stitch serialization to accomplish precision stiffness control such as by using a modified travelling salesman algorithm and/or using the Dijkstra algorithm for a shortest path.

The invention is directed to several designs using the techniques herein including puncture testing of physical samples to reveal the efficacy of this invention over traditional material tensile strength.

The system of manufacturing textiles with certain physical properties can include a design system having a design computer readable medium; a set of design computer readable instructions stored on the computer readable medium configured for: receiving a design pattern representing desired physical properties of a textile having a higher stiffness area and a lower stiffness area, developing a contiguous stitching pattern, without adjacent inline stitches, constrained by a pattern perimeter boundary and having a continuous stitching path, developing a first sub pattern within the contiguous stitching pattern represent a first area of density, developing a second sub pattern within the contiguous stitching pattern represent a second area of density wherein the first area of density has more stitch density than the second area of density, transmitting the contiguous stitching pattern to an embroidery machine configured to provide a textile having the contiguous stitching pattern incorporating into the textile.

The perimeter boundary can be the edges of textile, the areas where the patter is to be placed or a portion of that area.

The first sub pattern and the second sub pattern can be cooperatively associated to provide a non-uniform stiffness over the textile. The first sub pattern and the second sub pattern can be cooperatively associated to provide a non-heterogeneous stiffness across the textile. The first sub pattern can include more stiffness than the second sub pattern in the textile. The contiguous stitching pattern can include a random walk pattern with domain-specific constraints dictating edges.

The computer readable instructions can include instructions for receiving a user-defined threshold and the process ceases when the computer readable instructions determine that no stitches are longer than the user-defined threshold.

The first sub pattern can be a repeating pattern within the contiguous stitching pattern. The contiguous stitching pattern can include variable-stiffness embroidery blocks. The contiguous stitching pattern can include a stitch path touching all points in a dither sample included in the design pattern. Contiguous stitching pattern may include a random vertex starting point. The contiguous stitching pattern can include a path according to a placement of stitches configured to take a set of unordered stitches and produce the path connecting stitches. The first sub pattern can be selected from the group consisting of non-overlapping, parallel stitches, overlapping cross-stitches or a combination thereof.

Therefore, it is an object of the present invention to provide computer-controlled embroidery control and stitching to modify fabric material properties.

It is also an object of the present invention to provide precision embroidery combined with pattern computations to modify physical properties of a textile.

BRIEF DESCRIPTION OF THE SEVERAL VIEWS OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 9A illustrates an application of the modified textile;
FIG. 9B illustrates an application of the modified textile;
FIG. 9C illustrates an application of the modified textile.

DETAILED DESCRIPTION OF THE INVENTION

This invention is directed to an embroidery process to modify physical properties of textiles to support a wide spectrum of design options for textile applications including smart clothing, upholstery, custom fabric medical products, and other textiles including functional textiles. With reference to the drawings, the invention will now be described in more detail.

This invention includes at least two approaches to control the physical properties such as tensile properties of fabrics through purposeful stitch layout. The invention can include a series of variable-stiffness embroidery blocks (EB). The EB technique forms a meta-resolution that allows stacking of different EB elements to produce a desired change in (aggregate) stiffness. A second technique controls at the stitch-level (SL) through a density map and path planning as discussed herein. Both techniques assume as input a stiffness design derived manually for the results shown.

Figure 1A:
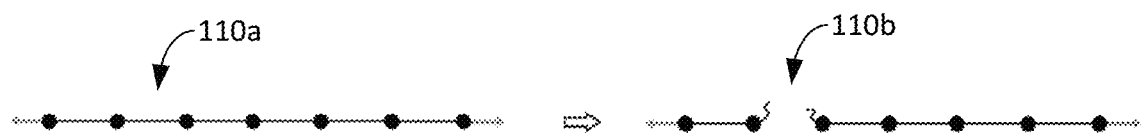
FIG. 1A is an illustrative example of a stitch.
Figure 1B:
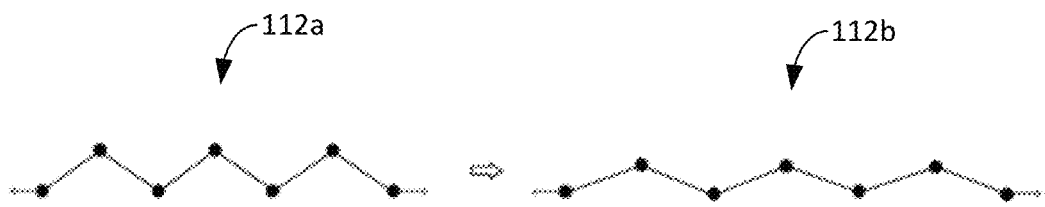
FIG. 1B is an illustrative example of a stitch.

Referring to FIGS. 1A and 1B, the design of stitch layout can account for primary and secondary effects on the strength and deformation characteristics of stitched fabrics. For example, threads stitched parallel to the primary direction of in-plane loading will lead to the greatest resistance but will also tend to fail at very small displacements as a single stitch 110a bears the entire load and can fail as shown by 110b. Although stiffening is reduced, a zigzag stitch 112a can be used to avoid thread failure, producing a tailored stretch response 112b that allows for some displacement while also increasing the local stiffness. In this stitching, as the zigzag stretches, the base material also stretches and carries a portion of the load, unlike the straight-line stitch.

Figure 2:
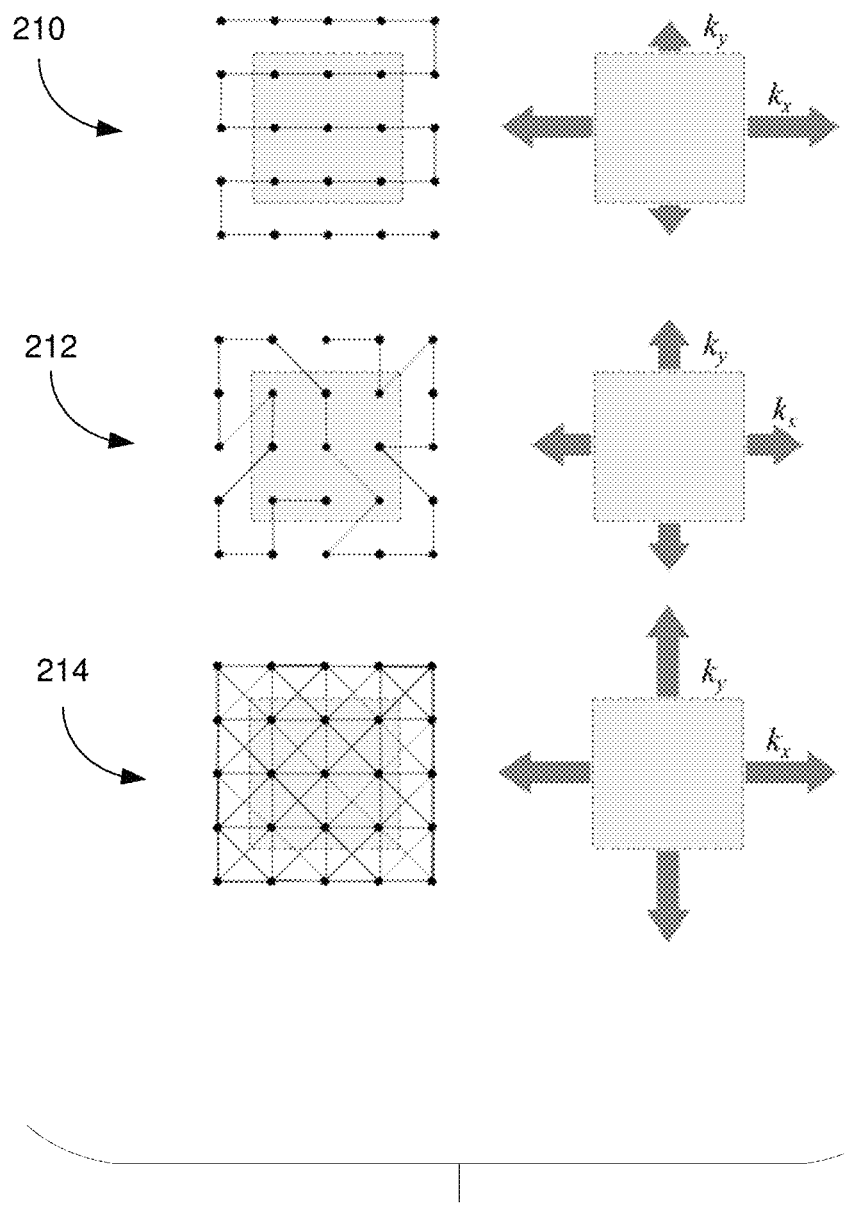
FIG. 2 shows sample 2D stitch layouts representing effects on stiffness of the material.

Referring to FIG. 2, stitching is shown in two dimensions with several options available such as the use of multiple stitch lines stitched in parallel to increase unidirectional strength and stiffness as in 210. This pattern can be referred to as an accordion stitch pattern and it can provide strong stiffening in one direction with relatively low stiffening in the orthogonal direction. Bi-directional stiffness results from consideration of multidirectional stitches across the material surface as in 212. Here, both the choice of patterns as well as the stitch density (SD) yields a wide set of options that allow for smooth modification of the elastic base layer from little adjustment to highly stiff, inextensible like fabric properties as in 214.

The output of modified stiffness or control is an embroidery plan implemented in a separate pass during manufacturing. For EB, each block is a straightforward accordion pattern (shown as 10 in FIG. 2) centered within the cell. The length of the pattern matches the size of the cell and provides stitch connectivity from block to block. The width of the accordion pattern can be set at three discrete values in one example to create equidistant regions that produce successively more resistance orthogonal to the pattern, (e.g. modulating stiffened) and unmodified material along a series of similar blocks. For each EB, two accordions appear, one horizontally and one vertically, running between the block's boundaries. In testing and by way of example, a block element size of 10 stitches per side was selected. The EB technique is easy to implement through simply coded stitch blocks of a set size, and the embroidery plan can be executed trivially through a raster-ordered layout in the final embroidery file.

Figure 3:
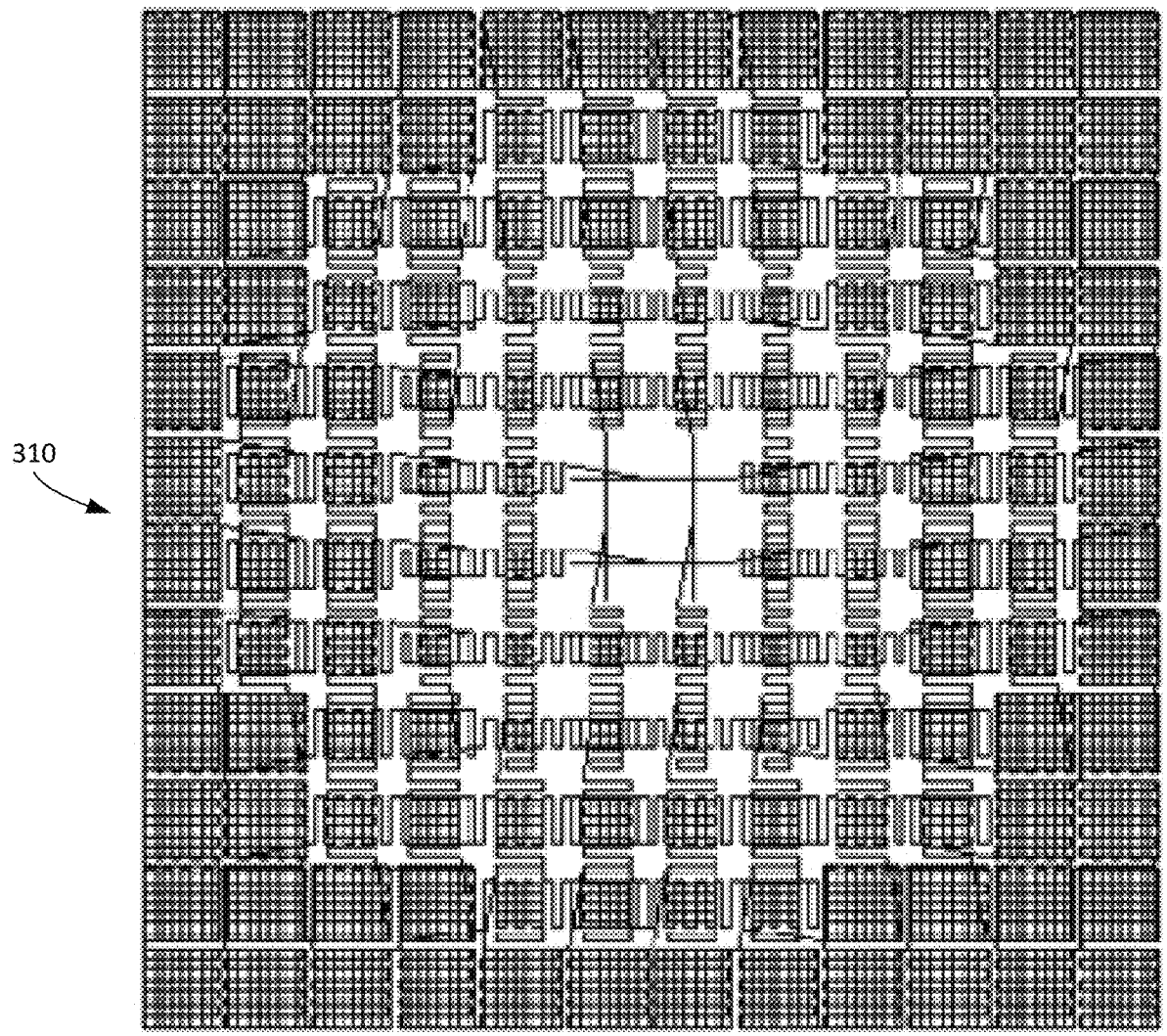
FIG. 3 is a sample accordion embroidery blocks (EB) assembled to produce a target with lower stiffness in its center. In this figure, three EB levels are allowed with simple rasterized stitch layout.

Referring to FIG. 3, an example of a stitching pattern 310 is shown. Contrasting the size of the block relative to the size of the stitch, the EB approach can yield a coarse discretization of the stiffness control based on the length of a single embroidery stitch, which is the hard-lower limit of control for the embroidery hardware. To achieve the goal of controlling stiffness at finer resolutions, ideally at the stitch level, the SL approach can be used which aggregates the general area of a set of stitches to control material strength through stitch density, SD. To provide the results the problem can be split into two subproblems and solved in turn. First, identify the placement of stitches required based on the input stiffness design, and a known calibration. Second, in a path planning stage, take the unordered stitches and produce a path that connects the stitches while upholding several constraints to complete the embroidery plan.

Figure 4:
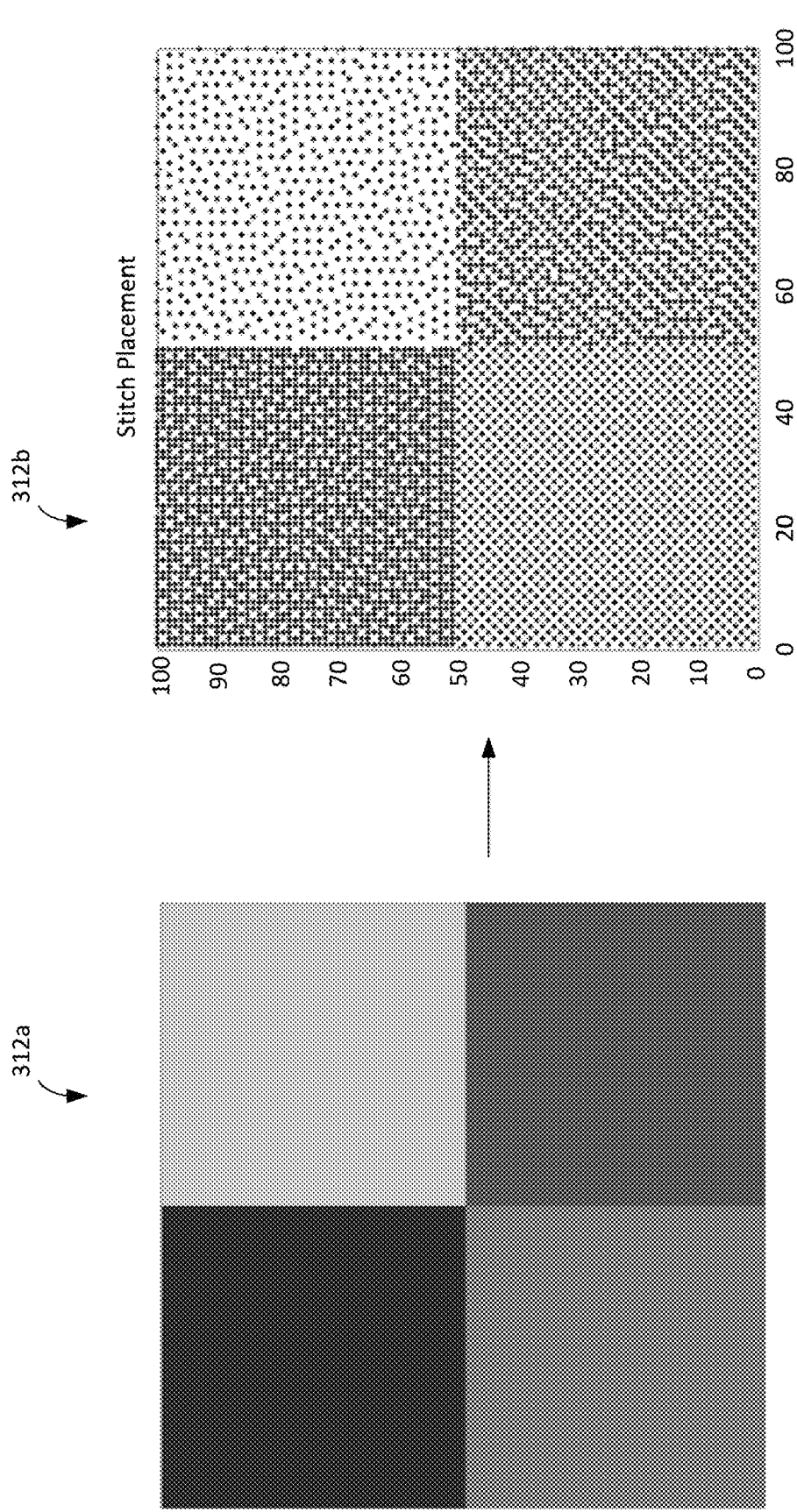
FIG. 4 is an illustration of example stitch placements.

Referring to FIG. 4, the placement for the SL stitches can be performed through production of dither sampling. For example, starting from a desired stiffness design, a simple parametric normalized stiffness can be interpreted that holds a value from 0, being no increases stiffness, to 1 or complete in extension. Given the assumption of uniform stiffening in both of the major (orthogonal) axes along the fabric surface, the sampling of the material is akin to producing a stipple pattern 312$b$ on a grayscale image 312$a$. In this case, the stitch direction can be irrelevant as long as the distribution of all stitches does not show a bias in directionality. Adding jitter to the position of the samples leads to removal of undesired aliasing in the path planning stage.

The dither sampling of the stiffness plan can be treated as a set of points to be visited. Rather than directly applying a solution to the travelling salesman problem, one embodiment can include several unique characteristics. First, varying coverage density across regions is not explicitly described in the prior art but can be implemented in this invention. Second, straight-line paths can be avoided to promote equal load balancing across the surface of the fabric. Third, long stitches are not preferable. To account for these issues, planning can use a variant of the traveling salesman problem.

In one example, let G=(V, E) be the complete graph derived from the dither samples of the stiffness plan, where each vertex v∈V denotes a 2D point, and each edge e=(u, v)∈E denotes a potential stitch between the vertices u and v. The solution can include a path that visits all samples, while penalizing steps that are straight and also avoiding long stitches. In one embodiment, the following cost as assigned between two successive edges in the path:

$$\text{cost}(u,v,w)=-\alpha-\|v,w\|\beta-|\cos(\phi)|$$

where u, v, and w are three successive stitch points, and φ is the angle between the edge e=(u, v) and its successor edge e'=(v, w). The weighting constants α, β≥1 control the importance of the two cost terms.

Given a stitch density map, a heuristic solution can be expressed as shown below:

---
Input: Stitch density map I ∈ [0, 255]2,
maximum stitch length threshold
Output: Stitch path P = {v1, . . . , vn}
G = (V, E) ←dither(I)
P ←greedy_search(G)
P ← 2-opt (P, threshold)
---

The starting point can be from a random vertex in the dither graph and then a greedy search can be performed where at each iteration the best unexplored vertex can be selected based on (u, v, w)=−α−∥v, w∥β−|cos(φ)|. As a post-processing step, the solution can be improved by employing a 2-opt heuristic approach that swaps one pair of edges for another pair with the same endpoints and shorter total length leading to a subsequence of the path to be reversed.

Another expression of the invention is shown below:

---
Input      :Path of dither sample points P = {v$_1$, v$_2$, . . . , v$_n$},
            maximum stitch length threshold
Output     :Modified path
while longest jump > threshold do
|   foreach edge = (v$_i$, v$_j$) where ∥v$_i$ − v$_j$∥ > threshold
|   do
|   |   foreach edge = (v$_k$, v$_l$) do
|   |   |   if ∥ v$_i$ − v$_j$ ∥ + ∥ v$_k$ − v$_l$ ∥ > ∥ v$_i$ − v$_k$ ∥ + ∥ v$_j$ − v$_l$ ∥
|   |   |   then
|   |   |   |   swap(v$_j$, v$_k$)
|   |   |   |__ update affected edges in P
|   |   |__
|   |__
|__
---

In this expression, the edges can be improved that are longer than a user-defined threshold and perform swaps in a lazy manner; edges can be swapped as soon as an improvement can be made rather than searching for the best possible swap. This 2-opt expression can halt when there are no edges longer than a user-defined threshold. This process allows the removal of the longest stitches in exchange for a modest amount of processing time.

Figure 5A:
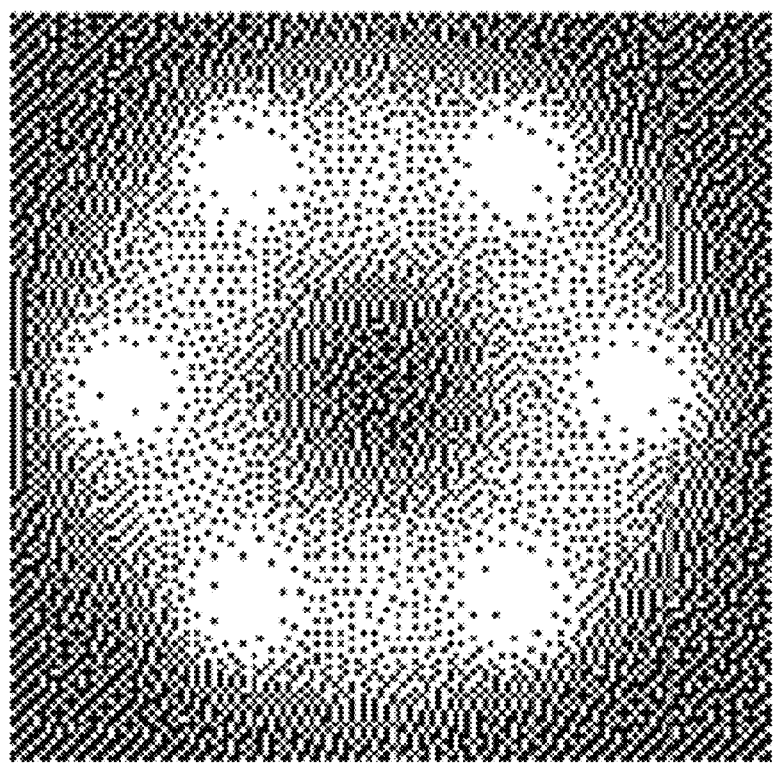
FIGS. 5A through 5C illustrate a stitch layout having cushioning properties.
Figure 5A:
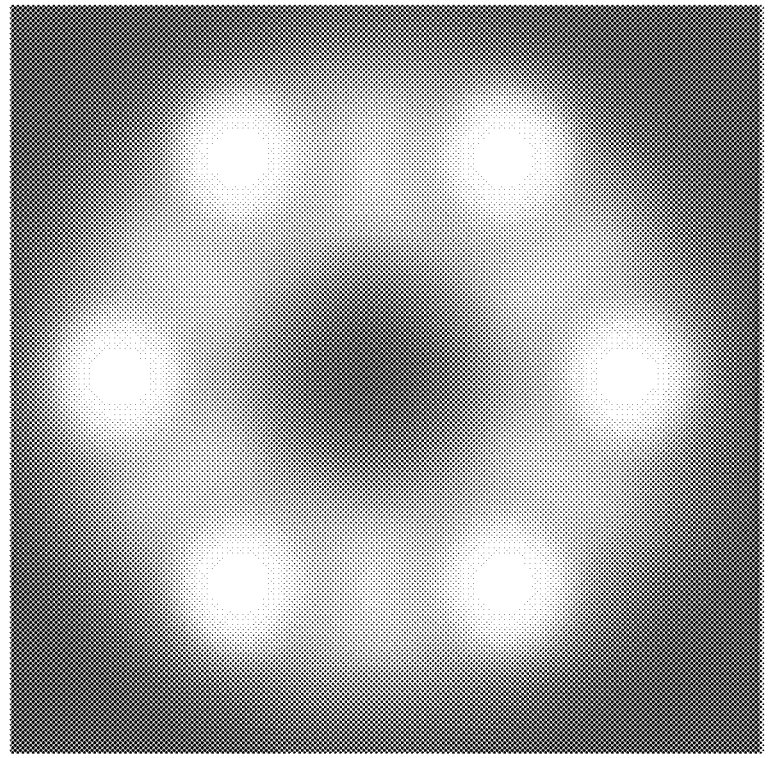
Figure 5B:
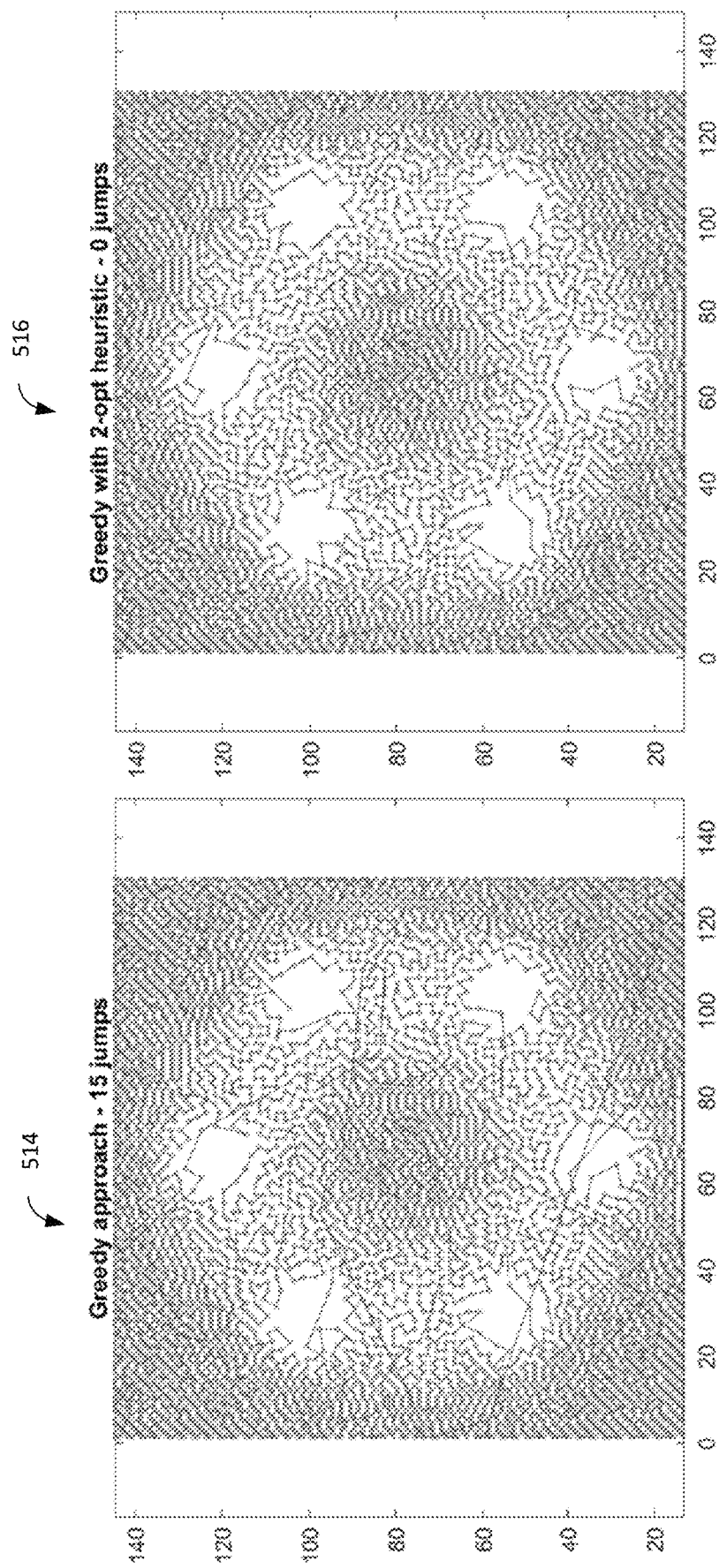
Figure 5C:
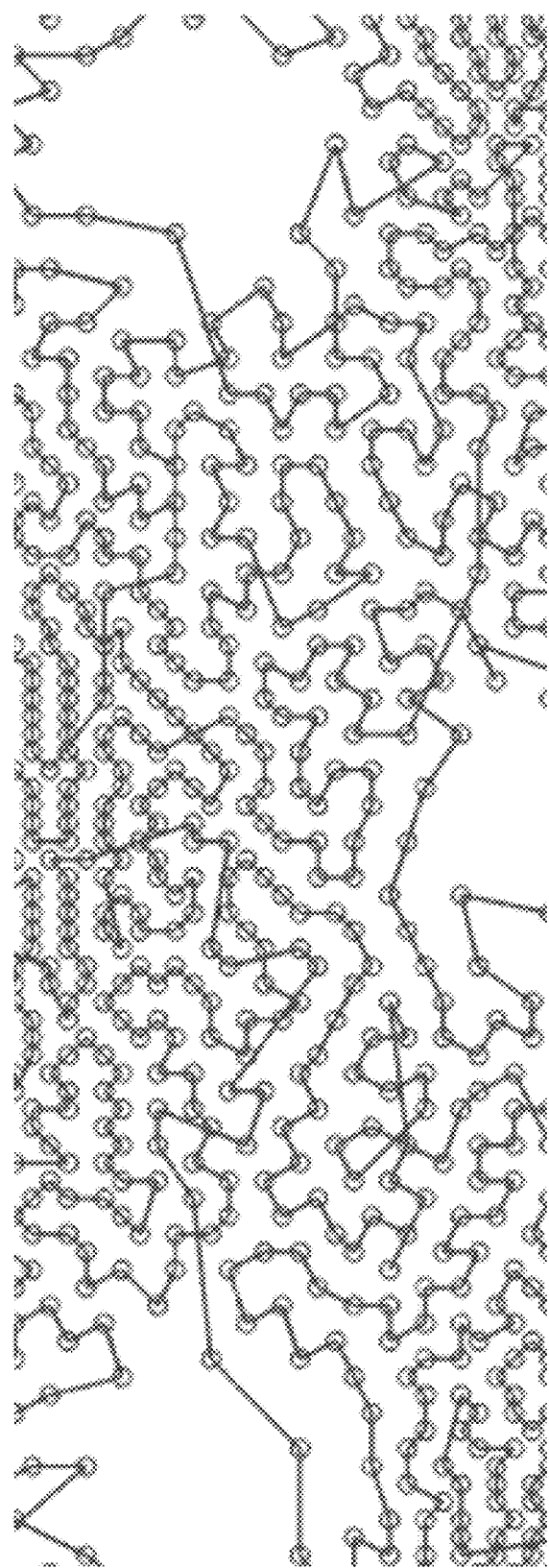

FIGS. 5A through 5C show a given stitch density map that was designed to enable pressure reducing support for a water bottle base. In this example, outer ring stretching creates stretch in a circle or circular pattern which is not a fabric pattern that can be made without application of the present invention. After performing a greedy search, one approach is able to return a path that follows the dithered stitch samples but has a number of stitches longer than a user-defined threshold of, on one example, 10 mm. By running the 2-opt post-processing step, a final stitch pattern is obtained with no long jumps. This approach can be run multiple times, where at each time a different greedy path is first obtained and then refined using the 2-opt heuristic. This process allows for a better match to be provided than the desired input stiffness map, and once more differentiates our problem from the traditional traveling salesman problem, as multiple points can be visited more than once.

FIGS. 5A through 5C show a stitch density map 510 and dithered stitch samples 512. A greedy solution 514 to TSP and a final stitch pattern after applying the 2-opt heuristic is shown as 516. A close-up showing continuous stitch density change is shown as 518.

In one test, the implementation was on a Brother SB7900E professional embroidery machine. A medium weight 4-way elastane material with 50 weight poly embroidery thread was used. Black and white respectively are selected to clearly show the stitch pattern. Basic operating procedures (based on the machine instructions) were used for the machinery to tension both the material and thread.

In one test, the stitching planning implementation runs in Matlab and exports the computed path into a custom machine-readable file that can be executed by the embroiderer. In one embodiment, the algorithm has a quadratic runtime complexity so that its performance depends on the number of input dither samples. For example, the water bottle cushion testcase shown in FIG. 5 contains 6850 stitches. On an Intel i7-6550 single threaded CPU, it took 11.63 s to obtain a greedy path and 42.11 s to further refine this solution using the 2-opt heuristic.

Figure 6A:
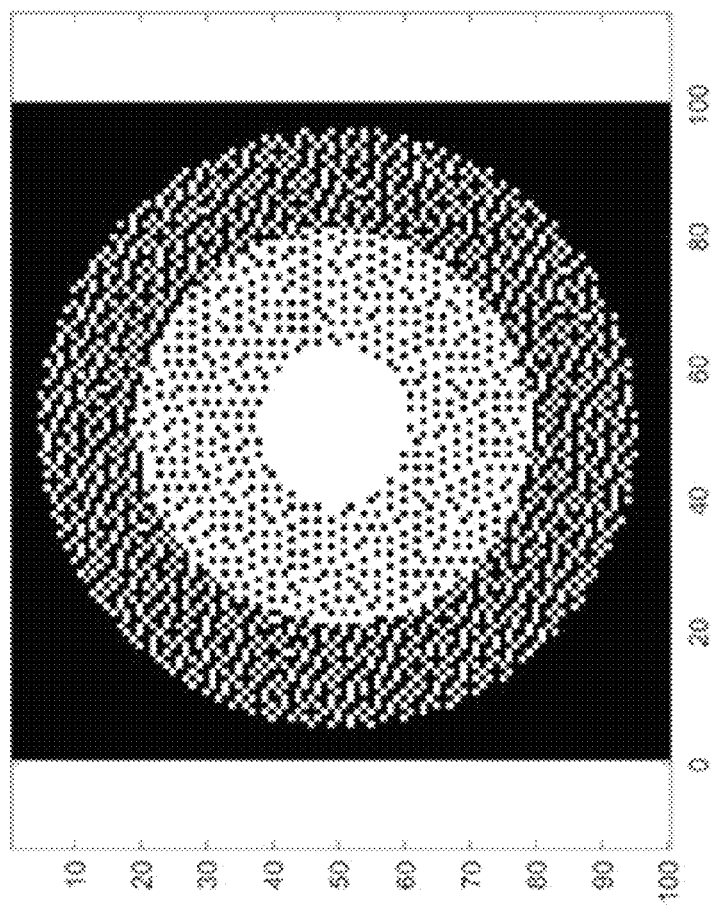
FIGS. 6A through 6C are illustrations of stitch layouts
Figure 6A:
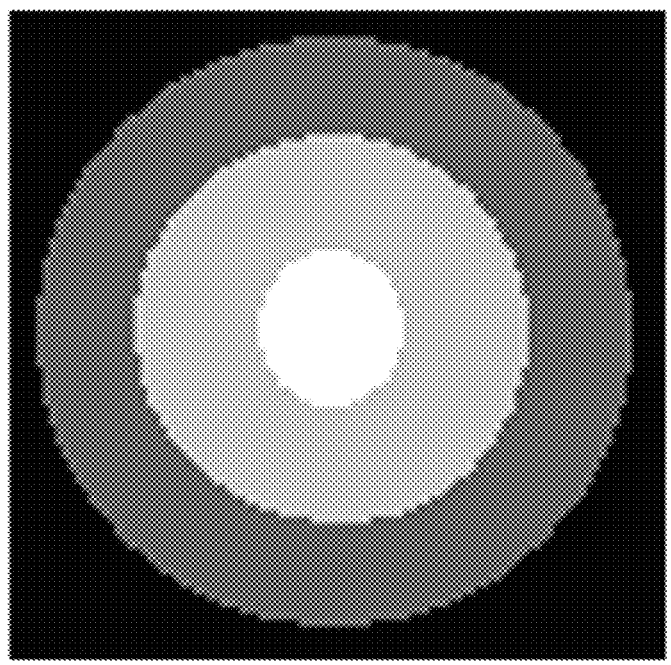
Figure 6B:
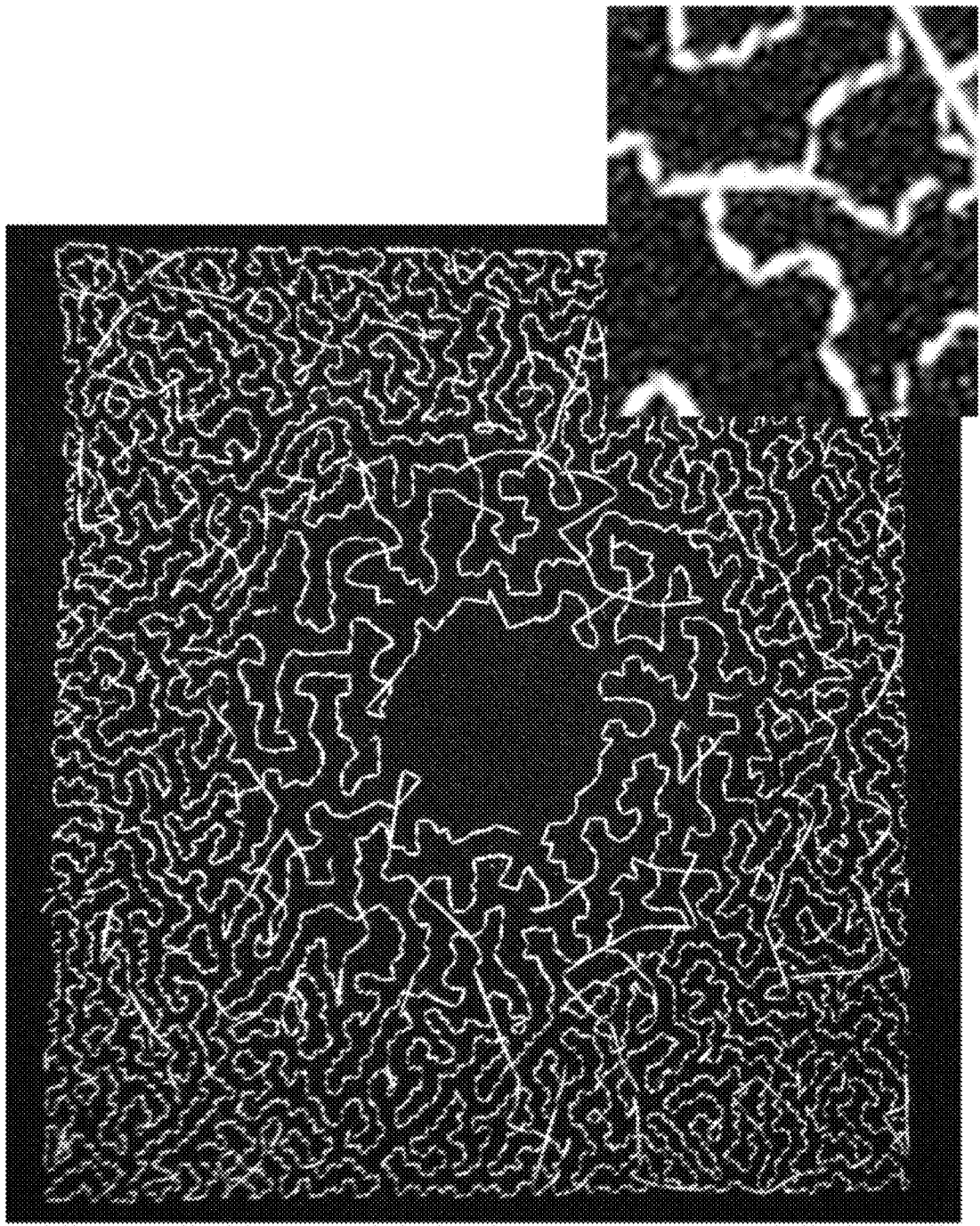
Figure 6C:
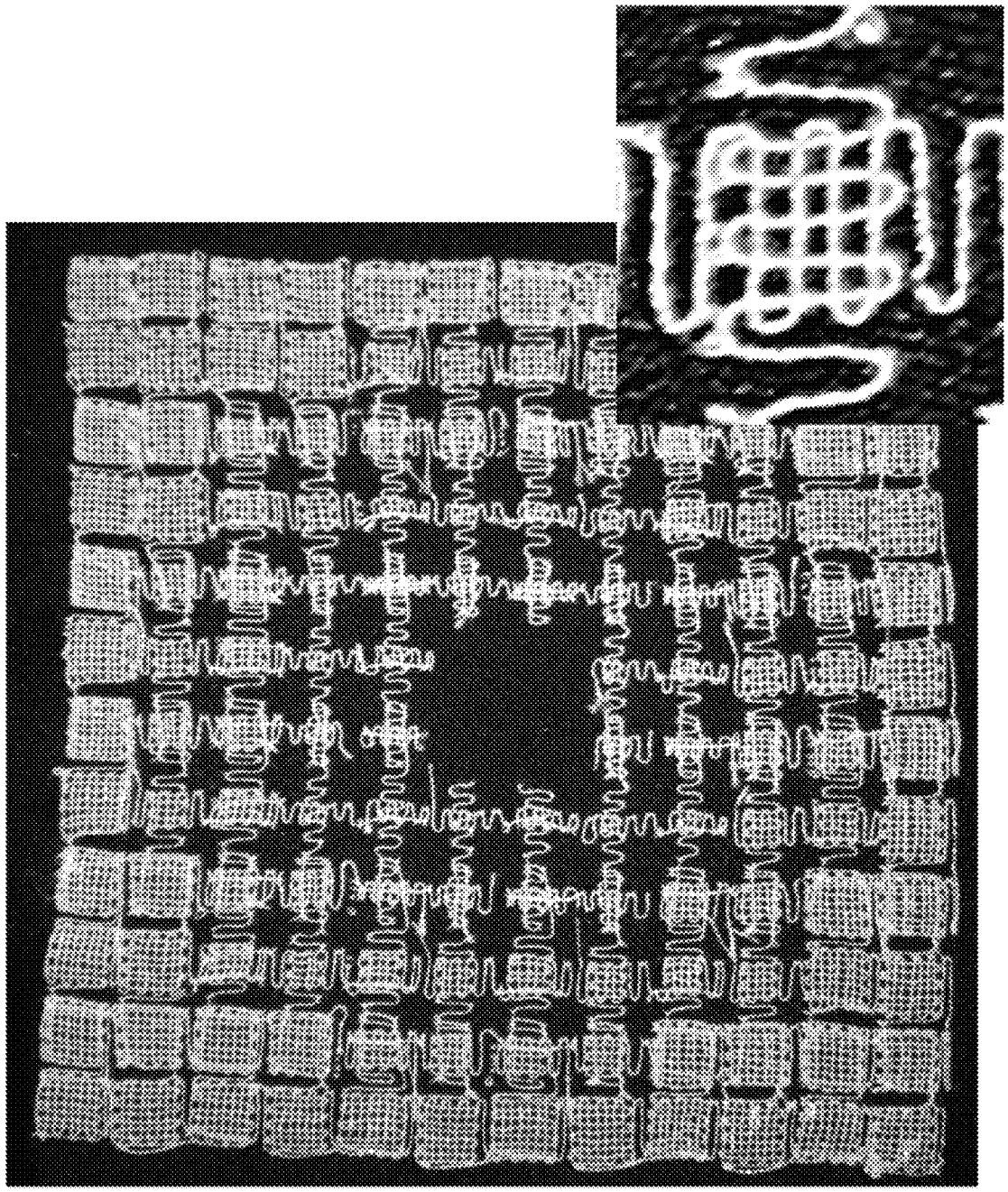

Referring to FIGS. 6A through 6C, examples of the stitch pattern designed to support a rounded article are shown.

Figure 7A:
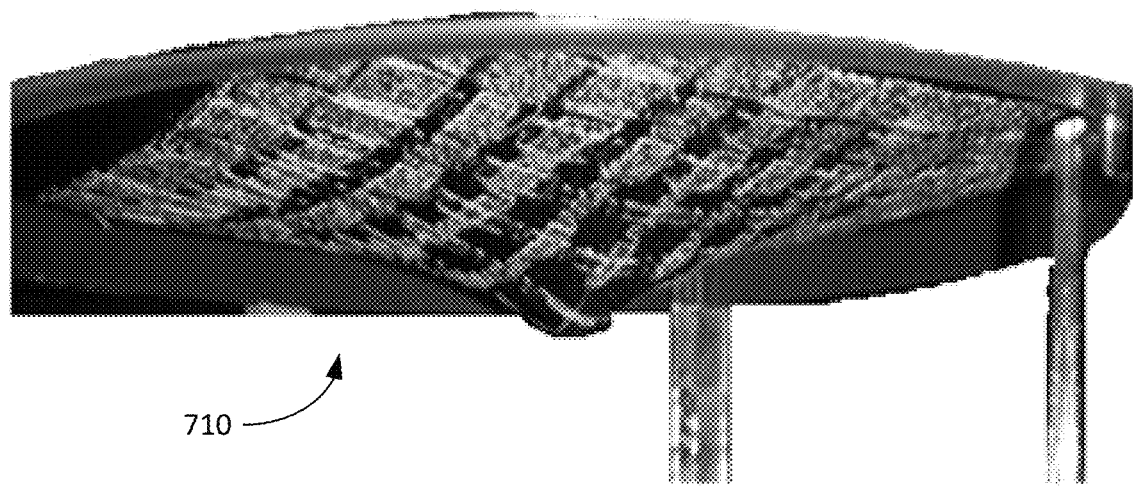
FIGS. 7A through 7B are perspective views of a fabric with a stitch layout.
Figure 7B:
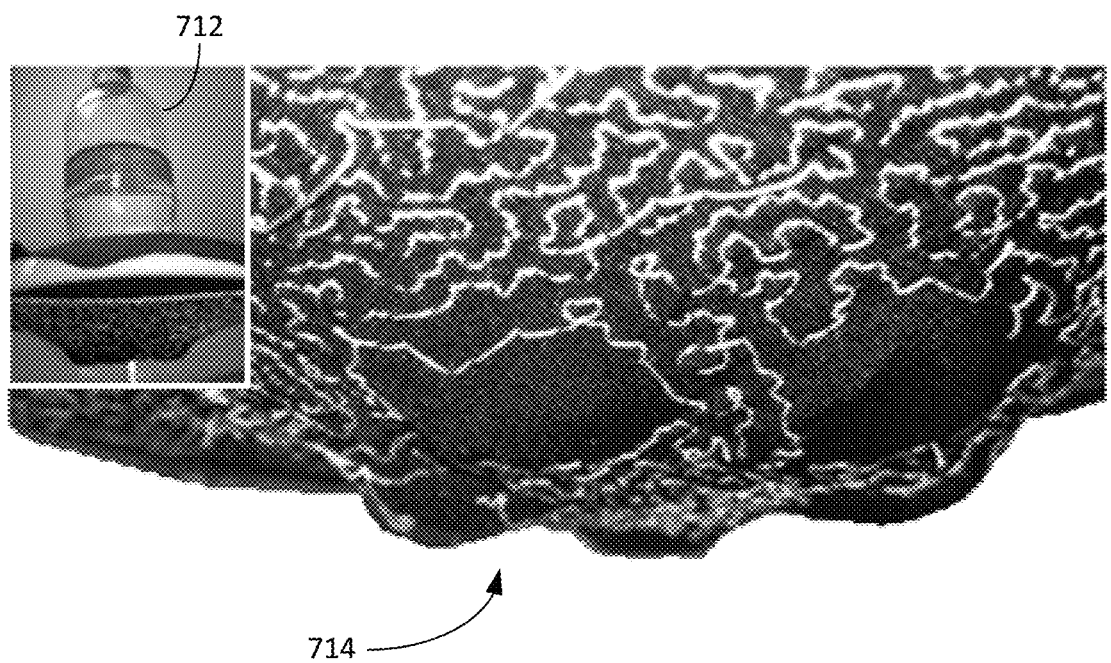

Referring to FIGS. 7A and 7B, qualitative results are shown under simple loads as in pattern 710 showing a target example with the EB approach showing graded stiffness toward center of target. In one test, a water bottle 712 having a contoured bottom is placed on a supported fabric. The stiffening contours and redistributes pressure under load as shown in 714.

In one test to quantify the tensile properties of various stitch patterns, a custom-built puncture device was used, with a 2.5 mm diameter puncture rod and 10.0 mm diameter test region, to apply radial, in-plane tensile stresses through selected circular regions of the stitched fabrics. The puncture device was connected to a universal material testing machine with a 500 N load cell (Shimadzu AGS-X) and the fabric samples were tested at a displacement rate of 1.0 mm/sec to a total displacement of 8.0 mm, at which point the tests were interrupted.

Figure 8:
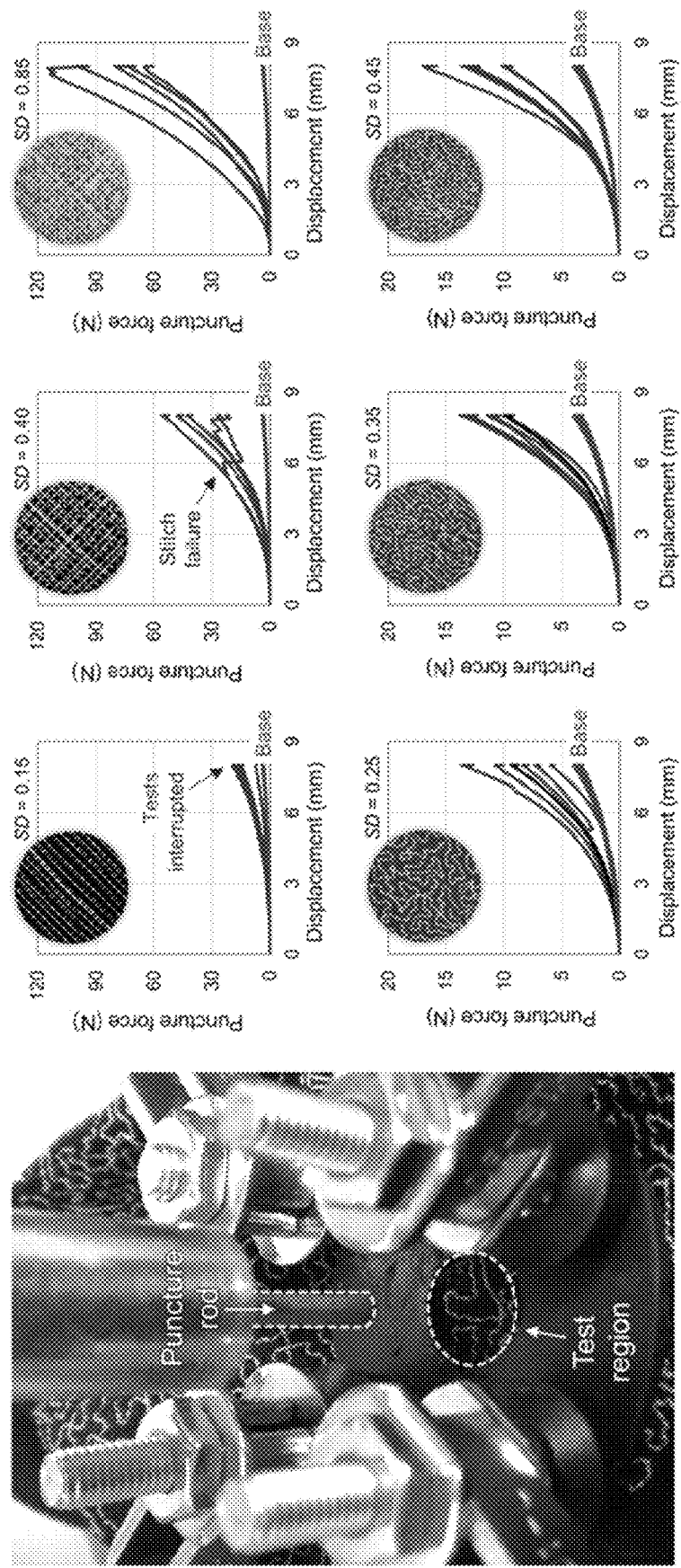
FIG. 8 are examples of testing results.

FIG. 8 shows an image of the test setup and the resulting force displacement curves for six samples of uniform embroidery patterns and stitch densities. The stitch densities (SD) were approximated by equally adjusting the image thresholds of the different patterns. The top row of FIG. 8 compares three samples of straight-line stitches with increasing stitch densities, producing a notable increase in puncture strength and stiffness. In some samples (e.g. SD=0.40), stitch failure was observed, indicating that the in-plane tensile stresses surpassed the strength of the embroidery thread—note this was more frequently observed in the medium-density straight line stitch patterns which (when sewn into orthogonal cross-stitches) bear the majority of the applied load.

The bottom row of FIG. 8 compares three samples using the SL stitch layout. Note that the comparable stitch density of these patterns, in contrast to the straight-line stitches, led to smaller, more gradual changes in puncture strength and stiffness (maximum load and slope of the force-displacement curves). This occurs because the stiffness of these patterns is more dependent on stitch layout than stitch density. That is, non-overlapping stitches tend to transfer transverse stresses through the base fabric. Hence, it is possible to tailor stitch patterns such that stitches added to a base fabric can have either a minimal influence on aggregate stiffness (via non-overlapping, parallel stitches) or a maximal influence on aggregate stiffness (via overlapping cross-stitches).

This invention is the first example of embroidery-type stitching being coupled with computational fabrication to yield textiles with varying material properties. This tests of the include examples that turn desired stiffness plans into realized samples that reveal quantitative tensile strength characteristics based on mechanical load testing.

There are any number of practical applications that would benefit from the described work. One example is akin to custom insoles that take a distinct pressure profile and build a unique insole to fit the individual. A similar product could be developed as a sling-style seat to allow a person that is wheelchair bound to relieve pressure that leads to bed sores. Smart clothing that shapes pressure profiles for blood circulation is another example for medical textiles (and may also be appropriate for performance apparel). Indeed, many medical textile applications focus on control for stiffness, for example directed stiffness to pinpoint mobility impedance in a joint brace envisioning a specialize knee-brace that allows bend but prevents twist.

Applications include custom chairs for long sits (custom pressure read leads to custom pressure seat for high-end chairs), handicap pressure control for wheelchairs, and to provide new dimensions of design and control in furniture.

Referring to FIG. 9A, one example of the application of the present invention is in the insole of footwear. An upper layer 910 can be disposed above a stitched layer 912. The stitched layer can be disposed above a lower layer 914. The upper layer and lower layer can be foam of other resilient material. The insole can provide for increased support at pressure points associated with the human foot. An example of a stitching pattern for an insole of footwear is shown as 916 in FIG. 9B. The stitching pattern can include less dense areas such as 918 where the foot generally requires less support and more dense areas such as 920 where more support is needed. During a stride of a wearer, the stitched layer can have areas of decreased stretch providing more support in those areas. Referring to FIG. 9C, the application of this invention can include the upper 922 of footwear. The upper can be constructed from a textile that includes the stitching of the present invention. Areas of less dense stitching such as 924 provide for more flexibility in the upper while areas of more sense stitching such as 926 can provide more support.

Figure 10A:
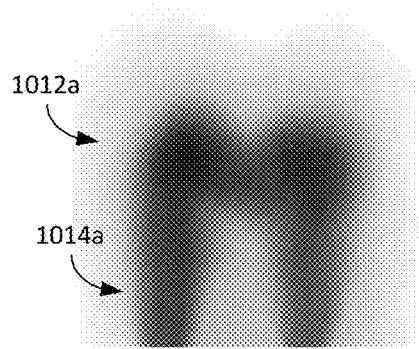
FIG. 10A illustrates an application of the modified textile.
Figure 10B:
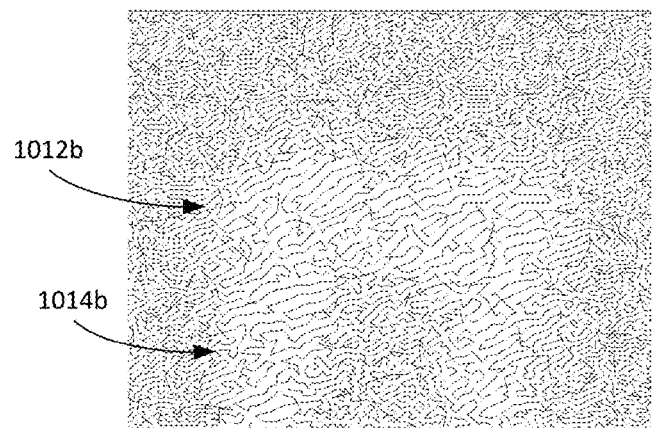
FIG. 10B illustrates an application of the modified textile.
Figure 10C:
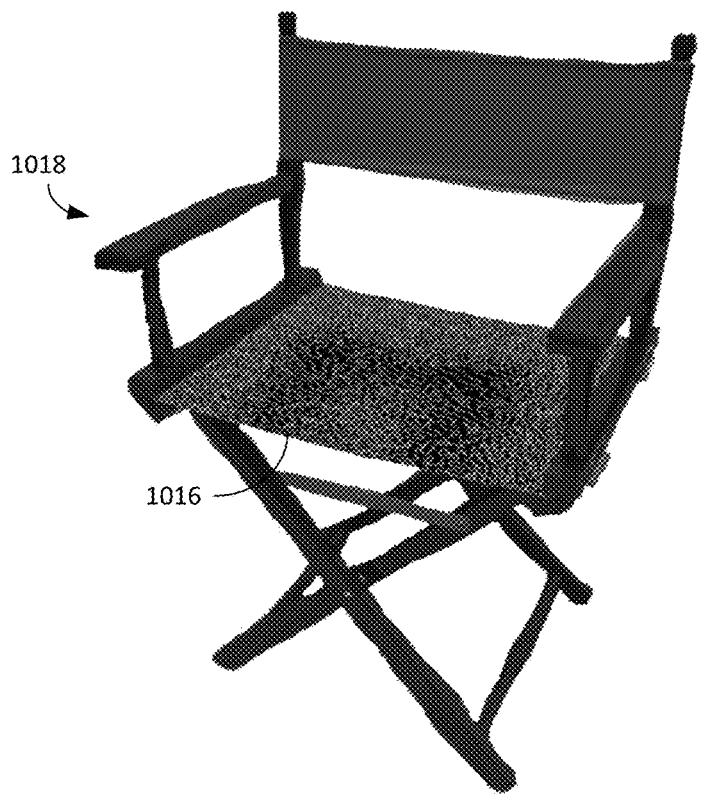
FIG. 10C illustrates an application of the modified textile.

Referring to FIG. 10A, one design process can include a determination of pressure points on an existing article. By way of example and not limitation, the pressure point of a fabric chair 1010 can be analyzed. Pressure points of an individual sitting in a chair show a hip area 1012a and leg area 1014a. Using this information, a stitch pattern can be designed as shown in FIG. 10B. The fabric design can include less dense areas corresponding to the hip area 1012b and leg areas 1014b. The stitched textile 1016 can be incorporated into a chair 1018 and provide support for the individual. Further applications can include the backs of chairs, custom chairs such as wheel chairs that need additional comfort, airplane seats that need support while also being light weight and even apparel that can provide shaping, support, compression of other benefits.

Figure 11:
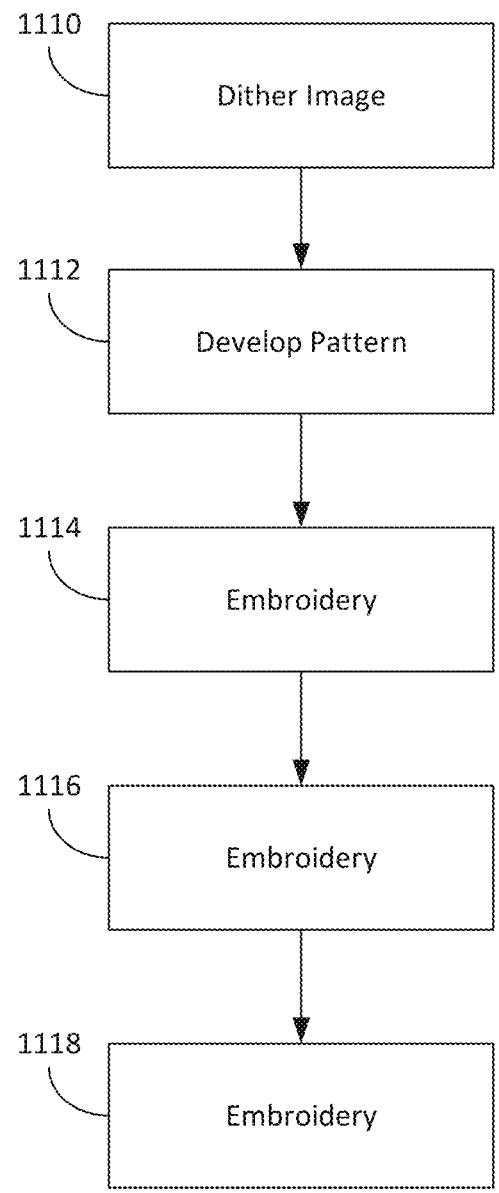
FIG. 11 illustrates a flowchart of aspects of the manufacturing process.

Referring to FIG. 11, an example implementation and process of the invention is further shown. At 1110, a dither image is entered that can be a representation of the desired textile properties used to develop a pattern design at 1112 shown in FIG. 5, 516 and 518 that, in one embodiment, can include a greedy 2-opt heuristic, 0 jumps pattern. The pattern design can then be used as input into an embroidering machine at 1114 to product the textile. The textile can be tested an analyzed at 1116 and/or used for manufacturing or production at 1118.

Figure 12A:
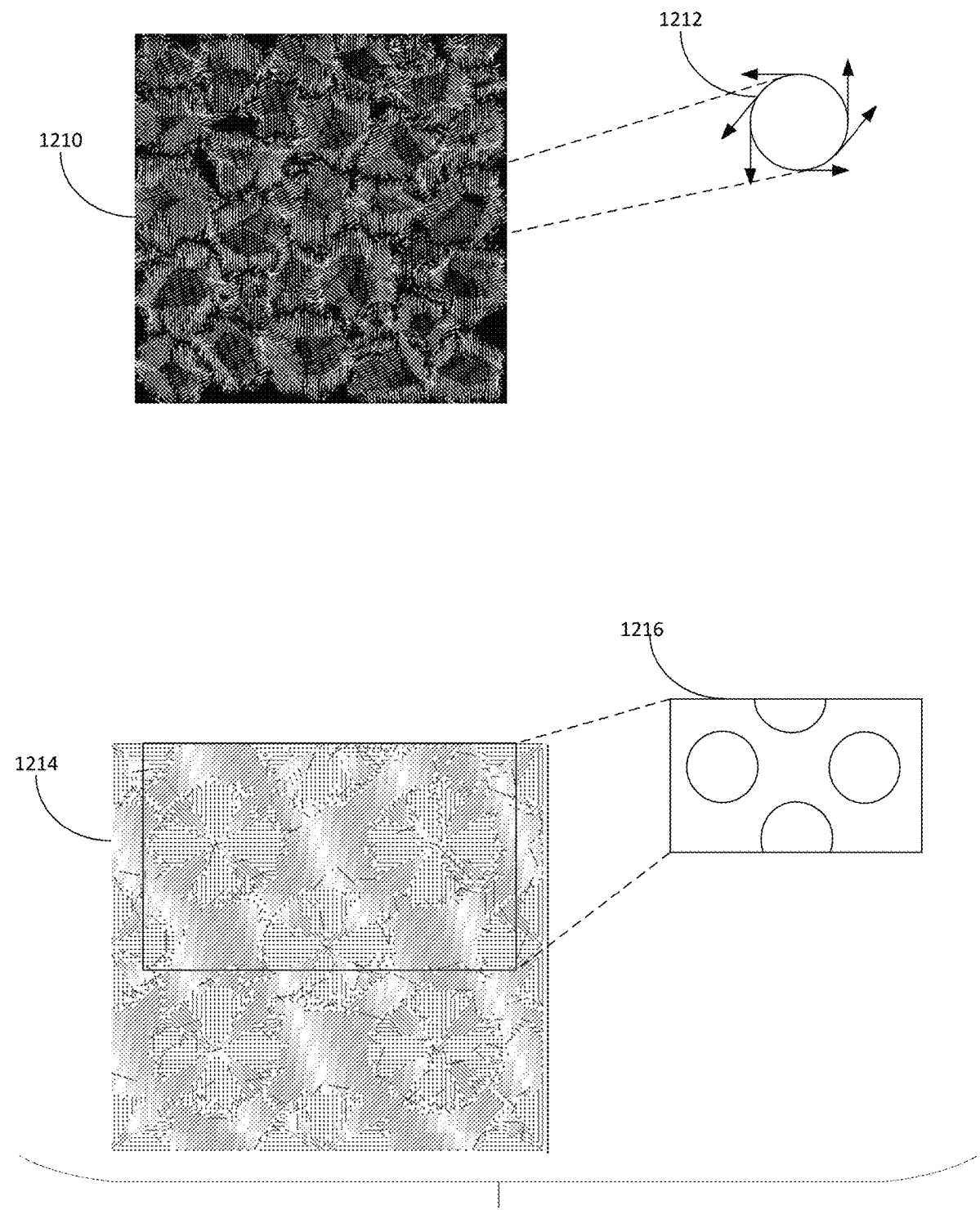
FIG. 12A illustrates patterns that can be included in the modified textile.
Figure 12B:
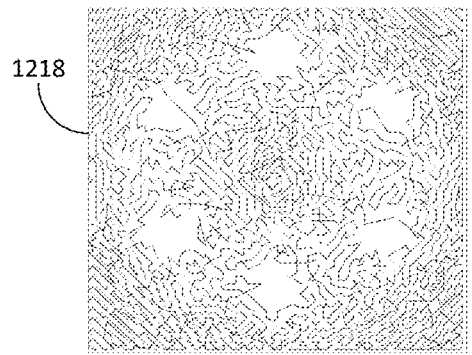
FIG. 12B illustrates patterns that can be included in the modified textile; and,
FIG. 13 illustrates patterns that can be included in the modified textile.
Figure 12B:
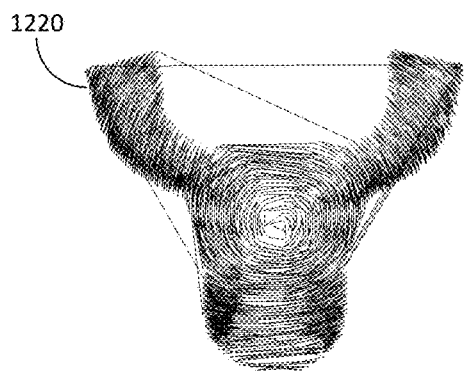
Figure 12B:
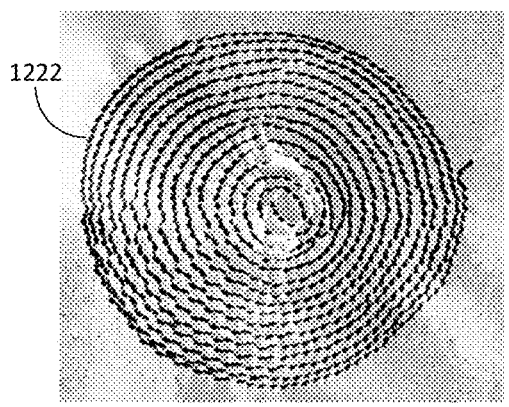

Referring to FIGS. 12A and 12B, the stitching pattern can be carefully controlled for direction based on arbitrary direction inputs. directions for a heterogenous pattern, as shown in 1210, can have stitches at any angle as shown in 1212. As shown by 1214, regular patterning of large dots as shown by 1216 are also possible with direction dictated by an additional pattern input.

Figure 13:
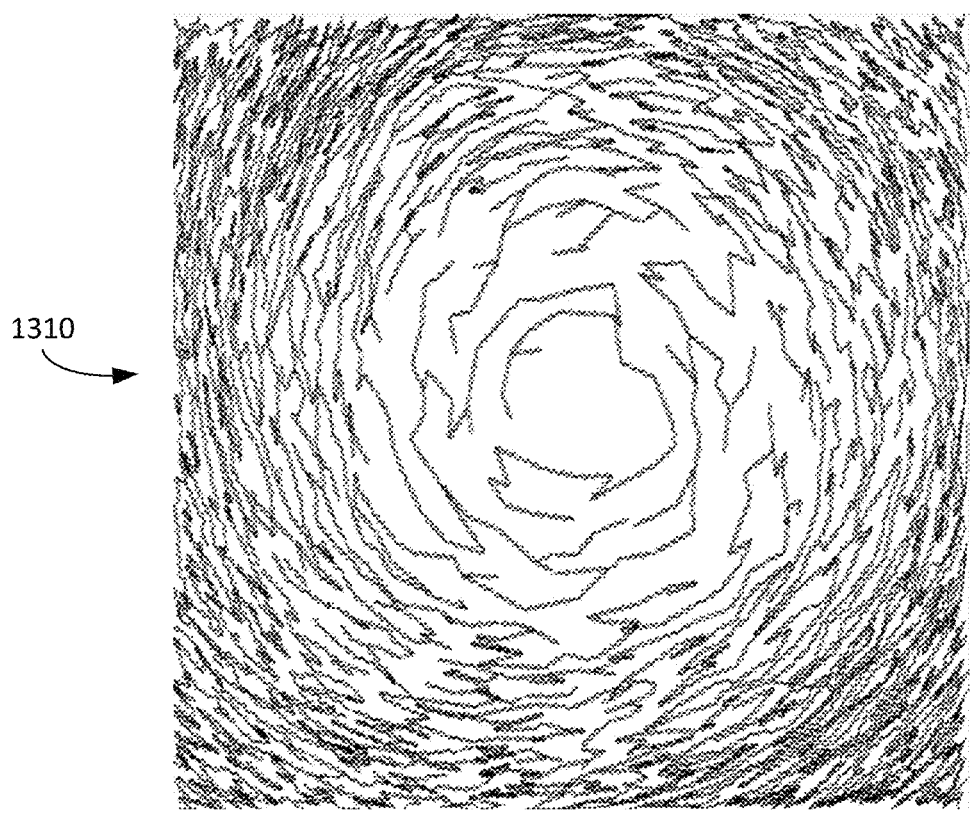

In one test, example output, may also include directed, non-uniform material property changes as shown in FIG. 13. In this example, Dijkstra's algorithm is employed to create a stiffness pattern that purposefully plans stitching according to a known direction plan, in this case the direction is a cone, continuous circumferential directed stitch design, coupled with a decreasing density design from high density to low density in the center of the cone. This test showcases the ability for the invented process to control the stiffness and direction of mechanical property changes in a precision manner.

Referring to FIG. 13, directional stitching adds additional constraints that can cause the travelling salesman process results in additional jumps. Therefore, 1310 shown a pattern with Dijkstra's shortest path algorithm accounting for both density (stiffness) and direction. The result of Dijkstra's algorithm and the resulting pattern is a traversable tree that is realized in stitching via a double zig-zag stitch as shown. The figure shows varying density. The areas of a first sub pattern can be generally along the edges with the second sub pattern generally in the center. The first sub pattern and the second sub pattern can blend into each other without necessarily having a clear boundary between the two areas.

It is understood that the above descriptions and illustrations are intended to be illustrative and not restrictive. It is to be understood that changes and variations may be made without departing from the spirit or scope of the following claims. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A computerized system for designing a textile with certain physical properties comprising:
   a computerized system having a non-transitory computer readable medium;
   a design pattern adapted to redistribute pressure when applied to an elastic base textile wherein the design pattern is stored on the computer readable medium;
   a set of computer readable instructions stored on the non-transitory computer readable medium configured for:
   receiving the design pattern;
   developing a stitching pattern constrained by the design pattern and having a continuous stitching path,
   developing a first pattern within the stitching pattern representing a first area of stiffness,
   developing a second pattern within the stitching pattern representing a second area of stiffness wherein the first pattern has higher stiffness than the second pattern the combination of the first-pattern and the second pattern are adapted to provide pressure reducing support of a physical object, and
   transmitting the stitching pattern to an embroidery machine wherein the embroidery machine is configured to provide a modified textile adapted to redistribute pressure applied by the physical object placed on the modified textile when compared to the pressure applied to the elastic base textile by the physical object.

2. The system of claim 1 wherein the first pattern and the second pattern are cooperatively associated to provide a first stiffness direction and a second stiffness direction wherein the first stiffness direction and the second stiffness direction change over the textile.

3. The system of claim 1 wherein the first pattern and the second pattern are cooperatively associated to provide a lower stiffness in a first direction and a higher stiffness in a second direction across the textile.

4. The system of claim 1 wherein the first pattern includes a higher tensile strength than the second pattern.

5. The system of claim 1 wherein developing the stitching pattern includes using a random walk pattern.

6. The system of claim 1 wherein the first pattern is an accordion pattern.

7. The system of claim 1 wherein the first pattern is a circular pattern.

8. The system of claim 1 wherein the set of computer readable instructions are configured for performing a traveling salesman post-processing 2-opt heuristic process to the stitching pattern.

9. The system of claim 8 wherein the set of computer readable instructions include instructions for receiving a user-defined threshold and the post-processing 2-opt heuristic process ceases when the set of computer readable instructions determine that no edges are longer than the user-defined threshold.

10. The system of claim 1 wherein the first pattern is a repeating pattern within the stitching pattern.

11. The system of claim 1 wherein the stitching pattern includes a variable stiffness block wherein the variable stiffness block is less elastic than an elasticity of a base elastic textile.

12. The system of claim 1 wherein the stitching pattern includes a stitch path touching all points in a dither sample included in the design pattern.

13. The system of claim 12 wherein the stitching pattern includes a random vertex starting point.

14. The system of claim 1 wherein the stitching pattern includes a path according to a placement of stiches configured to take a set of unordered stitches and produce a path of connecting stitches.

15. The system of claim 1 wherein the first pattern is selected from the group consisting of non-overlapping, parallel, overlapping, cross-stitches, zig-zag, circular, unordered, multidirectional, straight-line, or a combination thereof.

16. A computerized system for designing a textile comprising:
   a set of non-transitory computer readable instructions configured for:
   receiving a design pattern adapted to redistribute pressure resulting from placement of a physical object on a support textile;
   developing a stitching pattern constrained by a design pattern perimeter boundary and having a stitching path,
   developing a first pattern within the stitching pattern representing a first stiffness,
   developing a second pattern within the stitching pattern represent a second stiffness wherein a first area on a modified textile defined by the first pattern is more stiff than a second area on the modified textile defined by the second pattern, and
   transmitting the stitching pattern to an embroidery machine configured to stitch the stitching pattern to provide the support textile from a base elastic textile wherein the support textile redistributes pressure from placement of a physical object on the support textile when compared to the base elastic textile.

17. The computerized system of claim 16 wherein the first pattern has a higher stiffness strength than the second pattern.

18. A computerized system for manufacturing a textile comprising:
   a set of non-transitory computer readable instructions configured for:
   receiving a design pattern adapted to redistribute pressure resulting from placement of a physical object on a support textile;
   developing a stitching pattern according to the design pattern and having a stitching path,
   developing a first pattern within the stitching pattern having a first stiffness,
   developing a second pattern within the stitching pattern having a second stiffness wherein the first pattern has a higher stiffness than the second pattern the combination of the first pattern, the second pattern, and a base elastic textile is adapted to provide a modified planer stretch property of the textile, and
   transmitting the stitching pattern to an embroidery machine configured to provide the support textile by applying the stitching pattern to an elastic base textile wherein the first pattern and the second pattern combine to redistribute pressure applied by placement of a physical object on the support textile when compared to the base elastic textile.

19. A computerized system for manufacturing a textile comprising:
   a set of non-transitory computer readable instructions configured for:
   receiving a design pattern adapted to redistribute pressure applied by placement of a physical object on a support textile when the design pattern is applied to a base elastic textile;
   developing a stitching pattern adapted for application on a base elastic textile according to the design pattern,
   developing a first stiffness area within the stitching,
   developing a second stiffness area within the stitching pattern wherein the first stiffness area has a higher stiffness value than the second stiffness area and the stitching pattern combined with the base elastic textile is adapted to provide a modified linear stretch property support surface, and
   transmitting the stitching pattern to an embroidery machine configured to provide the support textile having the stitching pattern incorporating into the base elastic textile wherein the support textile redistributes pressure applied by the physical object on the support textile when compared to the pressure applied by the physical object on the base elastic textile.

20. The system of claim 19 wherein the set of computer readable instructions are configured for developing the stitching pattern having stitching in a known direction according to a Dijkstra planning process.

21. The system of claim 1 wherein developing the stitching pattern includes developing the stitching pattern according to a base elasticity of the textile.

22. The system of claim 16 wherein a combination of the first pattern and the second pattern defines a modified textile adapted to provide a modified support surface.

23. The system of claim 19 wherein developing a stitching pattern includes actuating a 2-opt post-processing step.

* * * * *